(12) United States Patent
Koh et al.

(10) Patent No.: US 8,455,605 B2
(45) Date of Patent: Jun. 4, 2013

(54) RESIN COMPOSITION FOR TRANSPARENT ENCAPSULATION MATERIAL AND ELECTRONIC DEVICE FORMED USING THE SAME

(75) Inventors: Sang-Ran Koh, Uiwang-si (KR);
June-Ho Shin, Uiwang-si (KR);
Hyun-Jung Ahn, Uiwang-si (KR);
Sung-Hwan Cha, Uiwang-si (KR);
Young-Eun Choi, Uiwang-si (KR);
Doo-Young Jung, Uiwang-si (KR);
Sang-Kyun Kim, Uiwang-si (KR);
Jong-Seob Kim, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 0 days.

(21) Appl. No.: 13/535,673

(22) Filed: Jun. 28, 2012

(65) Prior Publication Data

US 2012/0270998 A1 Oct. 25, 2012

Related U.S. Application Data

(63) Continuation of application No. PCT/KR2010/008927, filed on Dec. 14, 2010.

(30) Foreign Application Priority Data

Dec. 31, 2009 (KR) .................. 10-2009-0136185

(51) Int. Cl.
*C08G 77/60* (2006.01)
(52) U.S. Cl.
USPC ............................................................. 528/35
(58) Field of Classification Search
USPC ............................................................. 528/35
See application file for complete search history.

(56) References Cited

U.S. PATENT DOCUMENTS

| 4,983,641 | A | 1/1991 | Gross et al. | |
|---|---|---|---|---|
| 5,326,816 | A | 7/1994 | Kinami et al. | |
| 5,622,782 | A * | 4/1997 | Poutasse et al. | 428/344 |
| 7,659,357 | B2 | 2/2010 | Nakata et al. | |
| 2004/0097639 | A1 | 5/2004 | Gordon et al. | |
| 2007/0026689 | A1 | 2/2007 | Nakata et al. | |
| 2007/0099008 | A1 | 5/2007 | Shimizu et al. | |
| 2007/0112147 | A1 | 5/2007 | Morita et al. | |
| 2007/0225437 | A1 | 9/2007 | Morita et al. | |
| 2007/0287208 | A1 | 12/2007 | Thompson et al. | |
| 2008/0090986 | A1 | 4/2008 | Khanarian et al. | |
| 2008/0220266 | A1 | 9/2008 | Murai et al. | |
| 2008/0241748 | A1 | 10/2008 | Motallebi et al. | |
| 2009/0247681 | A1 | 10/2009 | Morita et al. | |
| 2010/0155121 | A1 | 6/2010 | Nakata et al. | |
| 2010/0168313 | A1 | 7/2010 | Mizuno et al. | |
| 2011/0098400 | A1 | 4/2011 | Blanc-Magnard et al. | |

FOREIGN PATENT DOCUMENTS

| JP | 04-359062 A | 12/1992 |
|---|---|---|
| JP | 05-247349 A | 9/1993 |
| JP | 2007-016177 A | 1/2007 |
| KR | 10 1991-0018488 A | 11/1991 |
| KR | 10 2004-0048423 A | 6/2004 |
| KR | 10 2005-0016505 A | 2/2005 |
| KR | 10 2005-0075030 A | 7/2005 |
| KR | 10 2006-0096429 A | 9/2006 |
| KR | 10 2007-0007255 A | 1/2007 |
| KR | 10 2007-0026599 A | 3/2007 |
| KR | 10 2007-0034962 A | 3/2007 |
| KR | 10 2007-0045967 A | 5/2007 |
| KR | 10 2007-0089869 A | 9/2007 |
| KR | 10 2008-0003835 A | 1/2008 |
| KR | 10 2008-0034408 A | 4/2008 |
| KR | 10 2008-0047731 A | 5/2008 |
| KR | 10 2008-0081838 A | 9/2008 |
| KR | 10 2008-0089303 A | 10/2008 |
| KR | 10 2009-0106401 A | 10/2009 |
| WO | WO 2004/037877 A2 | 5/2004 |
| WO | WO 2006/001874 A1 | 1/2006 |

OTHER PUBLICATIONS

International Search Report in PCT/KR2010/008927, dated Aug. 25, 2011 (Koh, et al.).

* cited by examiner

*Primary Examiner* — Kuo-Liang Peng
(74) *Attorney, Agent, or Firm* — Lee & Morse, P.C.

(57) ABSTRACT

A resin composition for a transparent encapsulation material, the resin composition including a polysiloxane obtained by copolymerization of a first silicon compound represented by the following Chemical Formula 1 and a second silicon compound including a compound represented by the following Chemical Formula 2,

[Chemical Formula 1]

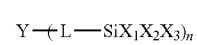

[Chemical Formula 2]

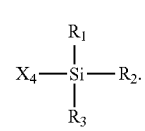

20 Claims, 1 Drawing Sheet

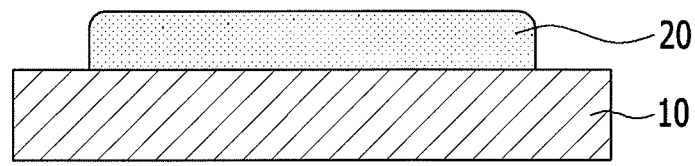

RESIN COMPOSITION FOR TRANSPARENT ENCAPSULATION MATERIAL AND ELECTRONIC DEVICE FORMED USING THE SAME

CROSS-REFERENCE TO RELATED APPLICATIONS

This application is a continuation of pending International Application No. PCT/KR2010/008927, entitled "Transparent Resin for Encapsulation Material and Electronic Device Including the Same," which was filed on Dec. 14, 2010, the entire contents of which are hereby incorporated by reference for all purposes.

This application claims priority under 35 U.S.C. §119 to Korean Patent Application No. 10-2009-0136185, filed on Dec. 31, 2009, the entire contents of which are hereby incorporated by reference for all purposes.

BACKGROUND

1. Field

Embodiments relate to a resin composition for a transparent encapsulation material and an electronic device including the same.

2. Description of the Related Art

A light emitting element such as a light emitting diode (LED), an organic light emitting device (OLED), a photoluminescent (PL) device, and the like has been variously applied to a domestic electronic device, a lighting device, a display device, various automatic devices, and the like. The light emitting element may display intrinsic colors of a light emitting material such as blue, red, and green using a light emitter, or white by combining light emitters displaying different colors.

SUMMARY

Embodiments are directed to a resin composition for a transparent encapsulation material, the resin composition comprising a polysiloxane obtained by copolymerization of a first silicon compound represented by the following Chemical Formula 1 and a second silicon compound including a compound represented by the following Chemical Formula 2,

[Chemical Formula 1]
$$Y-(L-SiX_1X_2X_3)_n$$

[Chemical Formula 2]

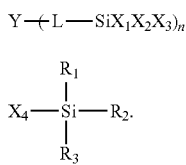

In Chemical Formula 1, n may be 2 or 3, when n is 2, Y may be selected from a single bond, a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, L may be a single bond or a substituted or unsubstituted C1 to C6 alkylene group, and $X_1$ to $X_3$ may each independently be selected from a C1 to C6 alkoxy group, a hydroxyl group, a halogen, a carboxyl group, and a combination thereof, and when n is 3, Y may be selected from a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, L may be a single bond or a substituted or unsubstituted C1 to C6 alkylene group, and $X_1$ to $X_3$ may each independently be selected from a C1 to C6 alkoxy group, a hydroxyl group, a halogen, a carboxyl group, and a combination thereof.

In Chemical Formula 2, $R_1$ to $R_3$ may each independently be selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and $X_4$ may be selected from a C1 to C6 alkoxy group, a hydroxyl group, a halogen, a carboxyl group, and a combination thereof.

The first silicon compound may include at least one of the compounds represented by the following Chemical Formulae 1a and 1b,

[Chemical Formula 1a]
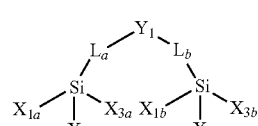

[Chemical Formula 1b]
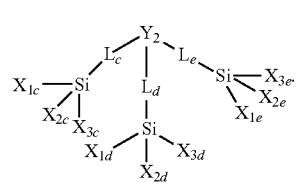

In Chemical Formula 1a, $Y_1$ may be selected from a single bond, a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, $L_a$ and $L_b$ may each independently be selected from a single bond or a substituted or unsubstituted C1 to C6 alkylene group, $X_{1a}$, $X_{2a}$, $X_{3a}$, $X_{1b}$, $X_{2b}$, and $X_{3b}$ may each independently be selected from a C1 to C6 alkoxy group, a hydroxyl group, a halogen, a carboxyl group, and a combination thereof.

In Chemical Formula 1b, $Y_2$ may be selected from a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, $L_c$ to $L_e$ may each independently be a single bond or a substituted or unsubstituted C1 to C6 alkylene group, $X_{1c}$, $X_{2c}$, $X_{3c}$, $X_{1d}$, $X_{2d}$, $X_{3d}$, $X_{1e}$, $X_{2e}$, and $X_{3e}$ may each independently be selected from a C1 to C6 alkoxy group, a hydroxyl group, a halogen, a carboxyl group, and a combination thereof.

The first silicon compound may include hexaethoxydisilane, bis(triethoxysilyl)methane, bis(triethoxysilyl)ethane, bis(triethoxysilyl)vinylene, bis(triethoxysilyl)benzene, bis(triethoxysilyl)biphenyl, or a combination thereof.

The second silicon compound may further include at least one of the compounds represented by the following Chemical Formulae 3 to 5,

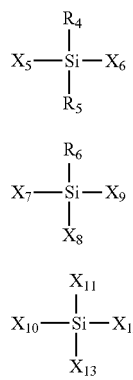

[Chemical Formula 3]

[Chemical Formula 4]

[Chemical Formula 5]

In Chemical Formulae 3 to 5, $R_4$ to $R_6$ may each independently be selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and $X_5$ to $X_{13}$ may each independently be selected from a C1 to C6 alkoxy group, a hydroxyl group, a halogen, a carboxyl group, and a combination thereof.

The polysiloxane may be a compound represented by the following Chemical Formula 6, $$(Y-(L-SiO_{3/2})_n)_{P1}(R_1R_2R_3SiO_{1/2})_{M1}(R_4R_5SiO_{2/2})_{D1}$$
$$(R_6SiO_{3/2})_{T1}(SiO_{4/2})_{Q1}$$  [Chemical Formula 6]

In Chemical Formula 6, n may be 2 or 3, when n is 2, Y may be selected from a single bond, a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, L may be a single bond or a substituted or unsubstituted C1 to C6 alkylene group, $R_1$ to $R_6$ may each independently be selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and P1, M1, D1, T1, and Q1 may satisfy the relations 0<P1<1, 0<M1<1, 0≦D1<1, 0≦T1<1, 0≦Q1<1, and P1+M1+D1+T1+Q1=1, and when n is 3, Y may be selected from a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, L may be a single bond or a substituted or unsubstituted C1 to C6 alkylene group, $R_1$ to $R_6$ may each independently be selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and P1, M1, D1, T1, and Q1 may satisfy the relations 0<P1<1, 0<M1<1, 0≦D1<1, 0≦T1<1, 0≦Q1<1, and P1+M1+D1+T1+Q1=1.

The polysiloxane may be included in an amount of about 50 wt % or more based on a total amount of the resin composition.

The resin composition may further include a hydrosilylation catalyst.

The hydrosilylation catalyst may include platinum, rhodium, palladium, ruthenium, iridium, or a combination thereof.

The hydrosilylation catalyst may be included in an amount of about 0.1 ppm to about 1000 ppm based on a total amount of the resin composition.

The resin composition may further include a polyorganosiloxane represented by the following Chemical Formula 7, $$(R_7R_8R_9SiO_{1/2})_{M2}(R_{10}R_{11}SiO_{2/2})_{D2}(R_{12}SiO_{3/2})_{T2}$$
$$(SiO_{4/2})_{Q2}$$  [Chemical Formula 7]

In Chemical Formula 7, $R_7$ to $R_{12}$ may each independently be selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and M2, D2, T2, and Q2 may satisfy the relations 0<M2<1, 0≦D2<1, 0≦T2<1, 0≦Q2<1, and M2+D2+T2+Q2=1.

The polyorganosiloxane may be included in an amount of less than 50 wt % based on a total amount of the resin composition.

The polyorganosiloxane represented by Chemical Formula 7 may be a vinyl terminated polyphenylmethylsiloxane, and the polysiloxane obtained by copolymerization of the first silicon compound and the second silicon compound may be included in the resin composition at a weight percentage of greater than 50% based on a total weight of the vinyl terminated polyphenylmethylsiloxane and the polysiloxane obtained by copolymerization of the first silicon compound and the second silicon compound.

Embodiments are also directed to a resin composition for a transparent encapsulation material, the resin composition including a polysiloxane compound represented by the following Chemical Formula 6,

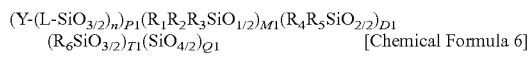   [Chemical Formula 6]

In Chemical Formula 6, n may be 2 or 3, when n is 2, Y may be selected from a single bond, a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, L may be a single bond or a substituted or unsubstituted C1 to C6 alkylene group, $R_1$ to $R_6$ may each independently be selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and when n is 3, Y may be selected from a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, L may be a single bond or a substituted or unsubstituted C1 to C6 alkylene group, $R_1$ to $R_6$ may each independently be selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and P1, M1, D1, T1, and Q1 may satisfy the relations $0<P1<1$, $0<M1<1$, $0\leq D1<1$, $0\leq T1<1$, $0\leq Q1<1$, and $P1+M1+D1+T1+Q1=1$.

The resin composition may further include a hydrosilylation catalyst.

The hydrosilylation catalyst may include platinum, rhodium, palladium, ruthenium, iridium, or a combination thereof.

The resin composition may further include a polyorganosiloxane represented by the following Chemical Formula 7,

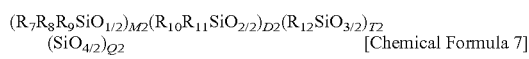   [Chemical Formula 7]

In Chemical Formula 7, $R_7$ to $R_{12}$ may each independently be selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and M2, D2, T2, and Q2 may satisfy the relations $0<M2<1$, $0\leq D2<1$, $0\leq T2<1$, $0\leq Q2<1$, and $M2+D2+T2+Q2=1$.

Embodiments are also directed to an electronic device comprising an encapsulation material prepared by curing the resin composition according to an embodiment.

The electronic device may include a light emitting diode, an organic light emitting device, a photoluminescent device, or a solar cell.

The encapsulation material may have a refractive index of 1.5 or more.

BRIEF DESCRIPTION OF THE DRAWING

The above and other features and advantages will become more apparent to those of skill in the art by describing in detail example embodiments with reference to the attached drawing, in which:

FIG. 1 illustrates a view of an electronic device according to an example embodiment.

DETAILED DESCRIPTION

Example embodiments will now be described more fully hereinafter; however, they may be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

As used herein, when a definition is not otherwise provided, the term "substituted" refers to one substituted with at least a substituent selected from the group of a halogen (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C30 alkyl group, a C2 to C16 alkenyl group, a C2 to C16 alkynyl group, a C6 to C30 aryl group, a C7 to C13 arylalkyl group, a C1 to C4 oxyalkyl group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a heterocycloalkyl group, and a combination thereof, instead of hydrogen of a compound.

As used herein, when a definition is not otherwise provided, the term "hetero" refers to one including 1 to 3 heteroatoms selected from N, O, S, and P.

Hereinafter, a resin composition for a transparent encapsulation material is described.

The resin composition according to an example embodiment includes a polysiloxane obtained by copolymerization of a first silicon compound represented by the following Chemical Formula 1 and a second silicon compound including a compound represented by the following Chemical Formula 2.

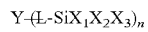   [Chemical Formula 1]

In Chemical Formula 1, n may be 2 or 3, when n is 2, Y may be selected from a single bond, a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, L may be a single bond or a substituted or unsubstituted C1 to C6 alkylene group, and $X_1$ to $X_3$ may each independently be selected from a C1 to C6 alkoxy group, a hydroxyl group, a halogen, a carboxyl group, and a combination thereof, and when n is 3, Y may be selected from a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, L may be a single bond or a substituted or unsubstituted C1 to C6 alkylene group, and $X_1$ to $X_3$ may each independently be selected from a C1 to C6 alkoxy group, a hydroxyl group, a halogen, a carboxyl group, and a combination thereof.

[Chemical Formula 2]

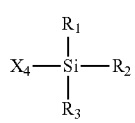

In Chemical Formula 2, $R_1$ to $R_3$ may each independently be selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and $X_4$ may be selected from a C1 to C6 alkoxy group, a hydroxyl group, a halogen, a carboxyl group, and a combination thereof.

The first silicon compound may include at least one of a dipodal compound represented by the following Chemical Formula 1a and a tripodal compound represented by the following Chemical Formula 1b.

[Chemical Formula 1a]

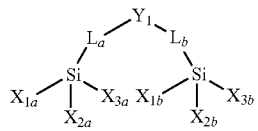

[Chemical Formula 1b]

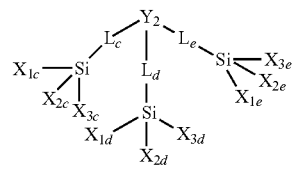

In Chemical Formula 1a and 1b, $Y_1$ may be selected from a single bond, a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, $L_a$ to $L_e$ may each independently be a single bond or a substituted or unsubstituted C1 to C6 alkylene group, and $X_{1a}$ to $X_{3e}$ may each independently be selected from a C1 to C6 alkoxy group, a hydroxyl group, a halogen, a carboxyl group, and a combination thereof, and $Y_2$ may be selected from a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, $L_a$ to $L_e$ may each independently be a single bond or a substituted or unsubstituted C1 to C6 alkylene group, and $X_{1a}$ to $X_{3e}$ may each independently be selected from a C1 to C6 alkoxy group, a hydroxyl group, a halogen, a carboxyl group, and a combination thereof.

The resin composition including the dipodal compound or tripodal compound may provide a high refractive index of about 1.5 or more, and thus control light loss due to a difference of a refractive index at a surface.

The resin composition including the dipodal compound or tripodal compound may provide a material that has high heat resistance, and thus yellowing (e.g., by exposure to heat from a light emitter for a long time) and reduction of light transmission may be reduced or avoided.

The resin composition including the dipodal compound or tripodal compound may provide low tackiness and thus adherence of encapsulation materials to each other during processing may be inhibited, resulting in improvement of proccessability.

The first silicon compound may include, for example, one of dipodal compounds represented by the following Chemical Formulae 1a-1 to 1a-4.

(1a-1)

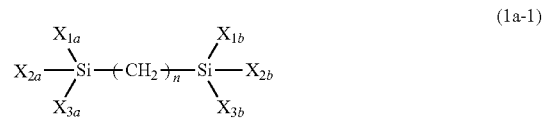

(1a-2)

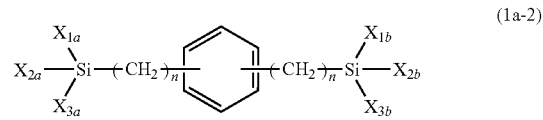

(1a-3)

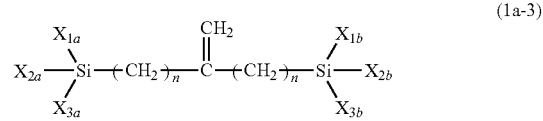

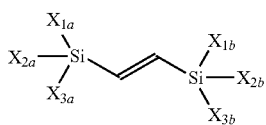

(1a-4)

In the above examples, $X_{1a}$ to $X_{3b}$, may each independently be selected from a C1 to C6 alkoxy group, a hydroxyl group, a halogen, a carboxyl group, and a combination thereof, and n may independently be 1 to 10.

The first silicon compound may include, for example, a tripodal compound represented by the following Chemical Formula 5.

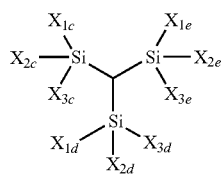

(5)

In the above example, $X_{1c}$ to $X_{3e}$ may each independently be selected from a C1 to C6 alkoxy group, a hydroxyl group, a halogen, a carboxyl group, and a combination thereof.

The first silicon compound may include, for example, hexaethoxydisilane (Y, $L_a$, and $L_b$ are each a single bond, and $X_{1a}$ to $X_{3b}$ are each an ethoxy group); bis(triethoxysilyl)methane (Y is a methylene group, $L_a$ and $L_b$ are each a single bond, and $X_{1a}$ to $X_{3b}$ are each an ethoxy group); bis(triethoxysilyl)ethane (Y is an ethylene group, $L_a$ and $L_b$ are each a single bond, and $X_{1a}$ to $X_{3b}$ are each an ethoxy group); bis(triethoxysilyl)vinylene (Y is a vinylene group, $L_a$ and $L_b$ are each a single bond, and $X_{1a}$ to $X_{3b}$ are each an ethoxy group); bis(triethoxysilyl)benzene (Y is an arylene group (phenylene), $L_a$ and $L_b$ are each a single bond, and $X_{1a}$ to $X_{3b}$ are each an ethoxy group); bis(triethoxysilyl)biphenyl (Y is a biphenylene group, $L_a$ and $L_b$ are each a single bond, and $X_{1a}$ to $X_{3b}$ are each an ethoxy group); or a combination thereof.

The second silicon compound may further include at least one of the compounds represented by the following Chemical Formulae 3, 4, and 5.

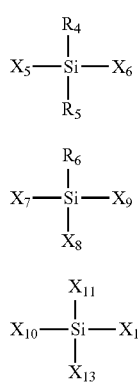

[Chemical Formula 3]

[Chemical Formula 4]

[Chemical Formula 5]

In Chemical Formulae 3 to 5, $R_4$ to $R_6$ may each independently be selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and $X_5$ to $X_{13}$ may each independently be selected from a C1 to C6 alkoxy group, a hydroxyl group, a halogen, a carboxyl group, and a combination thereof.

The polysiloxane may be a compound represented by the following Chemical Formula 6.

$$(Y\text{-}(L\text{-}SiO_{3/2})_n)_{P1}(R_1R_2R_3SiO_{1/2})_{M1}(R_4R_5SiO_{2/2})_{D1}(R_6SiO_{3/2})_{T1}(SiO_{4/2})_{Q1}$$ [Chemical Formula 6]

In Chemical Formula 6,

Y, L, n, $R_1$ to $R_6$ are the same as defined above with respect to Chemical Formulae 1 to 5. M1, D1, T1, and Q1 denote each mole ratio. In an implementation, P1, M1, D1, T1, and Q1 may satisfy the relations P1+M1+D1+T1+Q1=1, P1>0, M1>0, 0≦D1<1, 0≦T1<1, and 0≦Q1<1.

The polysiloxane may have a weight average molecular weight of about 100 to about 100000 g/mol, e.g., about 300 to about 20000 g/mol.

The polysiloxane may be included in an amount of about 50 wt % or more based on the total amount of the resin composition.

The resin composition for a transparent encapsulation material may further include a hydrosilylation catalyst, i.e., in addition to the polysiloxane.

The hydrosilylation catalyst may include, for example, platinum, rhodium, palladium, ruthenium, iridium, or a combination thereof.

The hydrosilylation catalyst may be included in an amount of about 0.1 ppm to about 1000 ppm based on the total amount of the resin composition.

The resin composition may further include a polyorganosiloxane represented by the following Chemical Formula 7.

$$(R_7R_8R_9SiO_{1/2})_{M2}(R_{10}R_{11}SiO_{2/2})_{D2}(R_{12}SiO_{3/2})_{T2}(SiO_{4/2})_{Q2}$$ [Chemical Formula 7]

In Chemical Formula 7, $R_7$ to $R_{12}$ may each independently be selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof. M2, D2, T2, and Q2 denote each mole ratio. In an implementation, M2, D2, T2, and Q2 may satisfy the relations 0<M2<1, 0≦D2<1, 0≦T2<1, 0≦Q2<1, and M2+D2+T2+Q2=1.

In an implementation, the polyorganosiloxane may be included in an amount of less than 50 wt % based on the total amount of the resin composition.

The resin composition may further include an adhesion promoter besides the above components, and the adhesion promoter may include, for example, glycidoxypropyltrimethoxysilane, vinyltriethoxysilane, glycidoxypropyltriethoxysilane, and the like.

The resin composition may be cured and used as an encapsulation material for an electronic device. The electronic device encapsulated by the cured resin may be selected from, or may include, for example, a light emitting diode, an organic light emitting diode device, a photoluminescent device, a solar cell, etc.

An electronic device such as described above may be provided in a packaging or an encapsulating structure. The packaging or encapsulating structure may include an encapsulant capable of transmitting light between the electronic device and the outside, and the encapsulant may be formed of a resin composition according to an embodiment. For example, referring to FIG. 1, an electronic device, e.g., a light emitting element, a solar cell, etc., may be provided in a packaging or encapsulating structure 20 that is disposed on a substrate 10, which may be opaque, reflective, transparent, semi-transparent, etc.

The encapsulation material obtained from the resin composition may exhibit high transmittance and high refractive index as well as good heat resistance, and thus may not undergo yellowing or degradation after being exposed to high temperature for a long time. Proccessability may be improved due to reduction of tackiness and increase of a hardness.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

Example 1

1 kg of a mixed solvent prepared by mixing water and toluene in a weight ratio of 5:5 was put in a three-necked flask and maintained at 23° C., and 300 g of a mixture of phenyltrichlorosilane, bis(trichlorosilyl)methane, and vinyldimethylchlorosilane mixed in a mole ratio of 85:5:10 was added thereto in a dropwise fashion for two hours. The resulting mixture was heated and refluxed for a condensation/polymerization reaction at 90° C. for 3 hours. Next, the reactant was cooled down to room temperature, and a water layer was removed therefrom, preparing a polymer solution dissolved in toluene. The polymer solution was cleaned with water to remove chlorine produced therein as a byproduct. Then, the neutral polymer solution was distilled under reduced pressure to remove toluene, acquiring liquid polysiloxane.

The polysiloxane was measured regarding molecular weight by performing gel permeation chromatography. As a result, it had a polystyrene-reduced molecular weight of 1900 g/mol. It was also identified to have a structure represented by Chemical Formula 8 by using H-NMR, Si-NMR, and an elemental analyzer. Herein, Me indicates a methyl group, Ph indicates a phenyl group, Vi indicates a vinyl group, and Si indicates silicon.

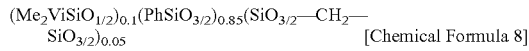

$(Me_2ViSiO_{1/2})_{0.1}(PhSiO_{3/2})_{0.85}(SiO_{3/2}\text{—}CH_2\text{—}SiO_{3/2})_{0.05}$ [Chemical Formula 8]

Example 2

A polysiloxane was prepared according to the same method as Example 1 except for using phenyltrichlorosilane, bis(trichlorosilyl)methane, and vinyldimethylchlorosilane in a mole ratio of 80:10:10.

The polysiloxane was measured regarding molecular weight by performing gel permeation chromatography. As a result, it had a polystyrene-reduced molecular weight of 2800 g/mol. In addition, it was identified to have a structure represented by Chemical Formula 9 by using H-NMR, Si-NMR, and an elemental analyzer.

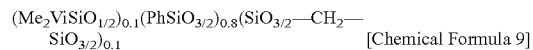

$(Me_2ViSiO_{1/2})_{0.1}(PhSiO_{3/2})_{0.8}(SiO_{3/2}\text{—}CH_2\text{—}SiO_{3/2})_{0.1}$ [Chemical Formula 9]

Example 3

A polysiloxane was prepared according to the same method as Example 1 except for using phenyltrimethoxysilane, hexaethoxydisilane, and vinyldimethylmethoxysilane in a mole ratio of 90:1:9 as monomers.

The polysiloxane was measured regarding molecular weight by performing gel permeation chromatography. As a result, it had a polystyrene-reduced molecular weight of 2500 g/mol. It was identified to have a structure represented by Chemical Formula 10 by using H-NMR, Si-NMR, and an elemental analyzer.

$(Me_2ViSiO_{1/2})_{0.09}(PhSiO_{3/2})_{0.9}(SiO_{3/2}\text{—}SiO_3)$ [Chemical Formula 10]

Example 4

A polysiloxane was prepared according to the same method as Example 1 except for using phenyltrimethoxysilane, hexaethoxydisilane, and vinyldimethylmethoxysilane in a mole ratio of 85:5:10.

The polysiloxane was measured regarding molecular weight by performing gel permeation chromatography. As a result, it had a polystyrene-reduced molecular weight of 2800 g/mol. It was identified to have a structure represented by Chemical Formula 11 by using H-NMR, Si-NMR, and an elemental analyzer.

$(Me_2ViSiO_{1/2})_{0.1}(PhSiO_{3/2})_{0.85}(SiO_{3/2}\text{—}SiO_3)$ [Chemical Formula 11]

Example 5

A polysiloxane was prepared according to the same method as Example 1 by using phenyltrimethoxysilane, hexaethoxydisilane, and vinyldimethylmethoxysilane in a mole ratio of 80:10:10.

The polysiloxane was measured regarding molecular weight by performing gel permeation chromatography. As a result, it had a polystyrene-reduced molecular weight of 3300 g/mol. It was identified to have a structure represented by Chemical Formula 12 by using H-NMR, Si-NMR, and an elemental analyzer.

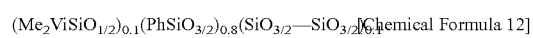

$(Me_2ViSiO_{1/2})_{0.1}(PhSiO_{3/2})_{0.8}(SiO_{3/2}\text{—}SiO_{3/2})_{0.1}$ [Chemical Formula 12]

Example 6

A polysiloxane was prepared according to the same method except for using 141.68 g of phenyldichlorosilane, 25.61 g of bis(trichlorosilyl)methane, and 6.72 g of tetramethyldisiloxane as monomers.

The polysiloxane was measured regarding molecular weight by performing gel permeation chromatography. As a result, it had a polystyrene-reduced molecular weight of 1560 g/mol. It was identified to have a structure represented by Chemical Formula 13 by using H-NMR, Si-NMR, and an elemental analyzer.

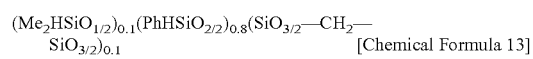

$(Me_2HSiO_{1/2})_{0.1}(PhHSiO_{2/2})_{0.8}(SiO_{3/2}\text{—}CH_2\text{—}SiO_{3/2})_{0.1}$ [Chemical Formula 13]

SUMMARY OF EXAMPLES 1 TO 6

Example 1: phenyltrichlorosilane, bis(trichlorosilyl)methane, and vinyldimethylchlorosilane; 85:5:10; 1900 g/mol.

Example 2: phenyltrichlorosilane, bis(trichlorosilyl)methane, and vinyldimethylchlorosilane; 80:10:10; 2800 g/mol.

Example 3: phenyltrimethoxysilane, hexaethoxydisilane, and vinyldimethylmethoxysilane; 90:1:9; 2500 g/mol.

Example 4: phenyltrimethoxysilane, hexaethoxydisilane, and vinyldimethylmethoxysilane; 85:5:10; 2800 g/mol.

Example 5: phenyltrimethoxysilane, hexaethoxydisilane, and vinyldimethylmethoxysilane; 80:10:10; 3300 g/mol.

Example 6: phenyldichlorosilane, bis(trichlorosilyl)methane, and tetramethyldisiloxane; 1560 g/mol.

Comparative Example 1

Polyorganosiloxane

A polyorganosiloxane was prepared according to the same method as Example 1 except for using phenyltrichlorosilane and vinyldimethylchlorosilane in a mole ratio of 90:10 but no bis(trichlorosilyl)methane as a monomer.

The polyorganosiloxane was measured regarding molecular weight by performing gel permeation chromatography. As a result, it had a polystyrene-reduced molecular weight of 1800 g/mol. It also was identified to have a structure represented by Chemical Formula 14 by using H-NMR, Si-NMR, and an elemental analyzer.

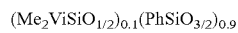

$(Me_2ViSiO_{1/2})_{0.1}(PhSiO_{3/2})_{0.9}$      [Chemical Formula 14]

Comparative Example 2

Polyorganosiloxane

A polyorganosiloxane was prepared according to the same method as Example 6 except for using 159.39 g of phenyldichlorosilane and 6.72 g of tetramethyldisiloxane.

The polyorganosiloxane was measured regarding molecular weight by performing gel permeation chromatography. As a result, it had a polystyrene-reduced molecular weight of 950 g/mol. It also was identified to have a structure represented by Chemical Formula 16 by using H-NMR, Si-NMR, and an element analyzer.

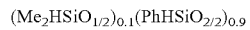

$(Me_2HSiO_{1/2})_{0.1}(PhHSiO_{2/2})_{0.9}$      [Chemical Formula 16]

Evaluation—1

The polysiloxanes according to Examples 1 to 5 and Comparative Example 1 were evaluated regarding transmission and heat resistance.

Initial light transmission was measured by using 1 mm of a cured polysiloxane specimen or a cured polyorganosiloxane specimen at a wavelength of 600 nm with a UV-spectrophotometer (UV-3600, Shimadzu Co., Ltd.). The heat resistance (light transmission after heating) was measured according to the same method as aforementioned after heating the cured specimen at 150° C. for 1000 hours.

The result is provided in Table 1.

TABLE 1

| | Example 1 | Example 2 | Example 3 | Example 4 | Example 5 | Comparative Example 1 |
|---|---|---|---|---|---|---|
| Initial transmission (%) | 96 | 96 | 96 | 96 | 96 | 95 |
| Transmission after heating (%) | 93 | 94 | 93 | 94 | 95 | 88 |

As shown in Table 1, each polysiloxane according to Examples 1 to 5 had a similar value between initial transmission and transmission after the heating at 150° C. for 1000 hours (heat resistance) and would thus exhibit almost no yellowing after exposure at a high temperature for a long time. The polyorganosiloxane according to Comparative Example 1 had remarkably deteriorated transmission due to yellowing.

Preparation of a Resin Composition

The polysiloxanes according to Examples 1 to 6, polyorganosiloxanes according to Comparative Examples 1 and 2, and a hydrosilylating catalyst were respectively mixed in a ratio provided in the following Table 2 and defoamed under vacuum, preparing a liquid resin composition. The hydrosilylating catalyst was Pt-CS 2.0 (Umicore Co.).

TABLE 2

| | | Polysiloxane | | | | | | Polyorganosiloxane | | Catalyst |
|---|---|---|---|---|---|---|---|---|---|---|
| | PMV-9925 | Ex. 1 | Ex. 2 | Ex. 3 | Ex. 4 | Ex. 5 | Ex. 6 | Comp. Ex. 1 | Comp. Ex. 2 | (ppm) |
| composition 1 | 30 | 60 | — | — | — | — | — | — | 10 | 5 |
| composition 2 | 30 | — | 60 | — | — | — | — | — | 10 | 5 |
| composition 3 | 30 | — | — | 60 | — | — | — | — | 10 | 5 |
| composition 4 | 30 | — | — | — | 60 | — | — | — | 10 | 5 |
| composition 5 | 30 | — | — | — | — | 60 | — | — | 10 | 5 |
| composition 6 | 30 | — | — | — | — | 60 | 10 | — | — | 5 |
| comparative composition 1 | 30 | — | — | — | — | — | — | 60 | 10 | 5 |

Note: PMV-9925: polyorganosiloxane (vinyl terminated polyphenylmethylsiloxane) $(Me_2ViSiO_{1/2}, PhMeSiO_{2/2})$—Gelest Inc.

Note: units: components except for a catalyst—parts by weight; catalyst—ppm.

Evaluation—2

Each composition prepared according to the ratio in Table 2 was well agitated and thermally cured at 150° C. for 1 hour. Cured compositions 1 to 6 and comparative composition 1 were measured regarding transmission, heat resistance, refractive index, tackiness, hardness, and adherence.

The transmission and heat resistance were evaluated using the same procedures as described above.

The refractive index of a liquid composition was measured by using an Abbe refractive index meter under D-line (589 nm) wavelength.

The tackiness was measured by measuring how much strength a cured composition has when a predetermined load was applied to it and taken apart from it by using TopTac 2000A.

The hardness was measured using Shore Hardness Tester (Type Shore D: IRHD Harteprufer, ZWICK).

The adherence was measured by sandwiching a polytetrafluoroethylene spacer (width: 10 mm, length: 20 mm, thickness: 1 mm) between two silver specimens (width: 25 mm, length: 50 mm, thickness: 1 mm). The space left between the spacers was charged with a composition and then, fixed with a clip. This resulting package was maintained in a 150° C. oven for 2 hours to cure a composition. The cured product was cooled down to a room temperature. Then, the clip and spacer were removed. The aforementioned silver specimen was put in a tensile tester and pulled toward an opposite horizontal direction until it was broken. Then, how much stress the specimen was applied with at that moment was measured.

The result is provided in Table 3.

TABLE 3

|  | Comp. 1 | Comp. 2 | Comp. 3 | Comp. 4 | Comp. 5 | Comp. 6 | Comparative Comp. 1 |
|---|---|---|---|---|---|---|---|
| Transmission (%) | 97 | 96 | 98 | 98 | 98 | 98 | 96 |
| Transmission after heating (%) | 94 | 94 | 95 | 95 | 95 | 95 | 89 |
| Refractive index | 1.53 | 1.53 | 1.53 | 1.53 | 1.53 | 1.53 | 1.53 |
| Tackiness | 28 | 15 | 35 | 18 | 11 | 8 | 45 |
| Hardness (Sh-D) | 38 | 45 | 32 | 42 | 45 | 55 | 20 |
| Adherence (MPa) | 16 | 20 | 17 | 19 | 22 | 25 | 10 |

As shown in Table 3, the compositions including polysiloxane according to Examples 1 to 6 had almost no change between initial transmission and transmission after the heating at 150° C. for 1000 hours (heat resistance) and, thus, would exhibit almost no yellowing after long-term exposure at a high temperature. However, the composition according to comparative composition 1 had yellowing after long-term exposure at a high temperature and, thus, significant transmission deterioration. In addition, the compositions according to Examples 1 to 6 were relatively less tacky and had a higher hardness and adherence than the composition according to Comparative Example 1.

The results show that a composition including polysiloxane and polyorganosiloxane in an appropriate ratio maintains high transmittance, decreases tackiness of an encapsulation material, and controls a hardness. Accordingly, the polyorganosiloxane compositions according Examples 1 to 6 may increase adherence and improve tackiness on the surface and, thus, easily control curing.

By way of summation and review, a light emitting element may have a packaging or encapsulation structure. This packaging or encapsulation structure may be made of a transparent encapsulation material that is able to externally pass light emitted from a light emitter. Such a transparent encapsulation material may be present at light-transmission positions, and thus transmission, refractive index, and hardness of the transparent encapsulation material may affect optical efficiency.

An embodiment provides a resin composition for forming a transparent encapsulation material that may provide improved physical properties and prevent reduction of optical efficiency. Another embodiment provides an electronic device including the transparent encapsulation material, the encapsulation material being formed from the resin composition.

The resin composition may provide a transparent encapsulation material that has a high refractive index and transmittance, while ensuring heat resistance and avoiding significant yellowing after exposure at high temperature for a long time. Also the resin composition may provide a low tackiness to inhibit adherence of encapsulation materials to each other during processing, which may improve proccessability.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A resin composition for a transparent encapsulation material, the resin composition comprising:
a hydrosilylation catalyst; and
a polysiloxane obtained by copolymerization of a first silicon compound represented by the following Chemical Formula 1 and a second silicon compound including a compound represented by the following Chemical Formula 2,

[Chemical Formula 1]

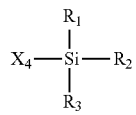
[Chemical Formula 2]

wherein, in Chemical Formula 1,
n is 2 or 3, when n is 2, Y is selected from a single bond, a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, L is a single bond or a substituted or unsubstituted C1 to C6 alkylene group, and $X_1$ to $X_3$ are each independently selected from a C1 to C6 alkoxy group, a hydroxyl group, a halogen, a carboxyl group, and a combination thereof, when n is 3, Y is selected from a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, L is a single bond or a substituted or unsubstituted C1 to C6 alkylene group, and $X_1$ to $X_3$ are each independently selected from a C1 to C6 alkoxy group, a hydroxyl group, a halogen, a carboxyl group, and a combination thereof, and in Chemical Formula 2, $R_1$ to $R_3$ are each independently selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and $X_4$ is selected from a C1 to C6 alkoxy group, a hydroxyl group, a halogen, a carboxyl group, and a combination thereof.

2. The resin composition as claimed in claim 1, wherein the first silicon compound includes at least one of the compounds represented by the following Chemical Formulae 1a and 1b,

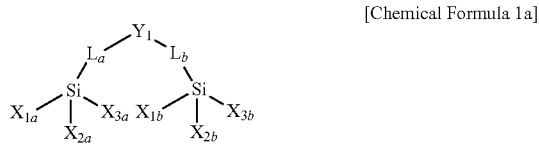

[Chemical Formula 1a]

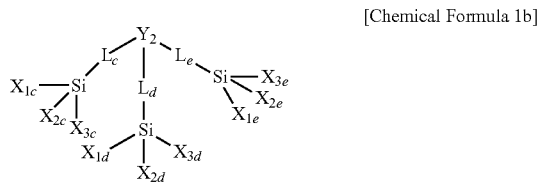

[Chemical Formula 1b]

wherein, in Chemical Formula 1a, $Y_1$ is selected from a single bond, a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, $L_a$ and $L_b$ are each independently selected from a single bond or a substituted or unsubstituted C1 to C6 alkylene group, $X_{1a}$, $X_{2a}$, $X_{3a}$, $X_{1b}$, $X_{2b}$, and $X_{3b}$ are each independently selected from a C1 to C6 alkoxy group, a hydroxyl group, a halogen, a carboxyl group, and a combination thereof, and wherein, in Chemical Formula 1b, $Y_2$ is selected from a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, $L_c$ to $L_e$ are each independently a single bond or a substituted or unsubstituted C1 to C6 alkylene group, $X_{1c}$, $X_{2c}$, $X_{3c}$, $X_{1d}$, $X_{2d}$, $X_{3d}$, $X_{1e}$, $X_{2e}$, and $X_{3e}$ are each independently selected from a C1 to C6 alkoxy group, a hydroxyl group, a halogen, a carboxyl group, and a combination thereof.

3. The resin composition as claimed in claim 1, wherein the first silicon compound includes hexaethoxydisilane, bis(triethoxysilyl)methane, bis(triethoxysilyl)ethane, bis(triethoxysilyl)vinylene, bis(triethoxysilyl)benzene, bis(triethoxysilyl)biphenyl, or a combination thereof.

4. The resin composition as claimed in claim 1, wherein the second silicon compound further includes at least one of the compounds represented by the following Chemical Formulae 3 to 5,

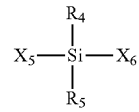

[Chemical Formula 3]

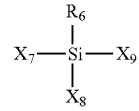

[Chemical Formula 4]

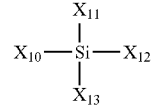

[Chemical Formula 5]

wherein, in Chemical Formulae 3 to 5, $R_4$ to $R_6$ are each independently selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and $X_5$ to $X_{13}$ are each independently selected from a C1 to C6 alkoxy group, a hydroxyl group, a halogen, a carboxyl group, and a combination thereof.

5. The resin composition as claimed in claim 1, wherein the polysiloxane is a compound represented by the following Chemical Formula 6,

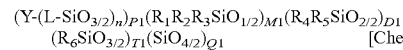

[Chemical Formula 6]

wherein, in Chemical Formula 6, n is 2 or 3, when n is 2, Y is selected from a single bond, a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, L is a single bond or a substituted or unsubstituted C1 to C6 alkylene group, $R_1$ to $R_6$ are each independently selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, $0<P1<1$, $0<M1<1$, $0<D1<1$, $0<T1<1$, $0<Q1<1$, and $P1+M1+D1+T1+Q1=1$, and when n is 3, Y is selected from a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, L is a single bond or a substituted or unsubstituted C1 to C6 alkylene group, $R_1$ to $R_6$ are each independently selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, $0<P1<1$, $0<M1<1$, $0<D1<1$, $0<T1<1$, $0<Q1<1$, and $P1+M1+D1+T1+Q1=1$.

6. The resin composition as claimed in claim 1, wherein the polysiloxane is included in an amount of about 50 wt % or more based on a total amount of the resin composition.

7. The resin composition as claimed in claim 1, wherein the hydrosilylation catalyst includes platinum, rhodium, palladium, ruthenium, iridium, or a combination thereof.

8. The resin composition as claimed in claim 1, wherein the hydrosilylation catalyst is included in an amount of about 0.1 ppm to about 1000 ppm based on a total amount of the resin composition.

9. An electronic device comprising an encapsulation material prepared by curing the resin composition as claimed in claim 1.

10. The electronic device as claimed in claim 9, wherein the electronic device includes a light emitting diode, an organic light emitting device, a photoluminescent device, or a solar cell.

11. The electronic device as claimed in claim 9, wherein the encapsulation material has a refractive index of 1.5 or more.

12. A resin composition for a transparent encapsulation material, the resin composition comprising a polysiloxane obtained by copolymerization of a first silicon compound represented by the following Chemical Formula 1 and a second silicon compound including a compound represented by the following Chemical Formula 2,

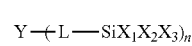 [Chemical Formula 1]

 [Chemical Formula 2]

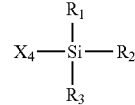

wherein, in Chemical Formula 1, n is 2 or 3, when n is 2, Y is selected from a single bond, a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, L is a single bond or a substituted or unsubstituted C1 to C6 alkylene group, and $X_1$ to $X_3$ are each independently selected from a C1 to C6 alkoxy group, a hydroxyl group, a halogen, a carboxyl group, and a combination thereof, when n is 3, Y is selected from a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, L is a single bond or a substituted or unsubstituted C1 to C6 alkylene group, and $X_1$ to $X_3$ are each independently selected from a C1 to C6 alkoxy group, a hydroxyl group, a halogen, a carboxyl group, and a combination thereof, and in Chemical Formula 2, $R_1$ to $R_3$ are each independently selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and $X_4$ is selected from a C1 to C6 alkoxy group, a hydroxyl group, a halogen, a carboxyl group, and a combination thereof, the resin composition further comprising a polyorganosiloxane represented by the following Chemical Formula 7,

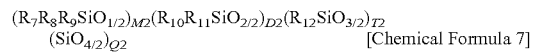 [Chemical Formula 7]

wherein, in Chemical Formula 7, $R_7$ to $R_{12}$ are each independently selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and $0<M2<1$, $0<D2<1$, $0<T2<1$, $0<Q2<1$, and $M2+D2+T2+Q2=1$.

13. The resin composition as claimed in claim 12, wherein the polyorganosiloxane is included in an amount of less than 50 wt % based on a total amount of the resin composition.

14. The resin composition as claimed in claim 12, wherein:
the polyorganosiloxane represented by Chemical Formula 7 is a vinyl terminated polyphenylmethylsiloxane, and
the polysiloxane obtained by copolymerization of the first silicon compound and the second silicon compound is included in the resin composition at a weight percentage of greater than 50% based on a total weight of the vinyl terminated polyphenylmethylsiloxane and the polysiloxane obtained by copolymerization of the first silicon compound and the second silicon compound.

15. An electronic device comprising an encapsulation material prepared by curing the resin composition as claimed in claim 12.

16. A resin composition for a transparent encapsulation material, the resin composition comprising:
a hydrosilylation catalyst; and
a polysiloxane compound represented by the following Chemical Formula 6,

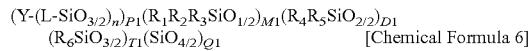  [Chemical Formula 6]

wherein, in Chemical Formula 6,
n is 2 or 3,
when n is 2, Y is selected from a single bond, a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, L is a single bond or a substituted or unsubstituted C1 to C6 alkylene group, $R_1$ to $R_6$ are each independently selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and
when n is 3, Y is selected from a substituted or unsubstituted C1 to C6 alkylene group, a substituted or unsubstituted C3 to C20 cycloalkylene group, a substituted or unsubstituted C6 to C20 arylene group, a substituted or unsubstituted C2 to C20 heteroarylene group, a substituted or unsubstituted C2 to C20 vinylene group, and a combination thereof, L is a single bond or a substituted or unsubstituted C1 to C6 alkylene group, $R_1$ to $R_6$ are each independently selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and
$0<P<1$, $0<M1<1$, $0<D1<1$, $0<T1<1$, $0<Q1<1$, and $P1+M1+D1+T1+Q1=1$.

17. The resin composition as claimed in claim 16, wherein the hydrosilylation catalyst includes platinum, rhodium, palladium, ruthenium, iridium, or a combination thereof.

18. The resin composition as claimed in claim 16, further comprising a polyorganosiloxane represented by the following Chemical Formula 7,

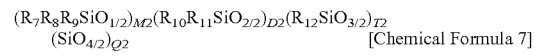  [Chemical Formula 7]

wherein, in Chemical Formula 7,
$R_7$ to $R_{12}$ are each independently selected from hydrogen, a substituted or unsubstituted C1 to C6 alkyl group, a substituted or unsubstituted C3 to C20 cycloalkyl group, a substituted or unsubstituted C6 to C20 aryl group, a substituted or unsubstituted C7 to C20 arylalkyl group, a substituted or unsubstituted C1 to C20 heteroalkyl group, a substituted or unsubstituted C2 to C20 heterocycloalkyl group, a substituted or unsubstituted C2 to C20 alkenyl group, a substituted or unsubstituted C2 to C20 alkynyl group, a substituted or unsubstituted C1 to C6 alkoxy group, a substituted or unsubstituted carbonyl group, a hydroxyl group, and a combination thereof, and
$0<M2<1$, $0<D2<1$, $0<T2<1$, $0<Q2<1$, and $M2+D2+T2+Q2=1$.

19. An electronic device comprising an encapsulation material prepared by curing the resin composition as claimed in claim 18.

20. An electronic device comprising an encapsulation material prepared by curing the resin composition as claimed in claim 16.

* * * * *